United States Patent [19]
Hegg

[11] Patent Number: 5,535,025
[45] Date of Patent: Jul. 9, 1996

[54] HELMET MOUNTED OFF AXIS LIQUID CRYSTAL DISPLAY WITH A FIBER OPTIC WEDGE AND A CURVED REFLECTOR

[75] Inventor: Ronald G. Hegg, Vista, Calif.

[73] Assignee: Hughes Training, Inc., Los Angeles, Calif.

[21] Appl. No.: 192,472

[22] Filed: Feb. 1, 1994

[51] Int. Cl.$^6$ .................................................. G02F 1/1335
[52] U.S. Cl. ................................ 359/40; 359/42; 359/70; 359/631; 359/41; 385/901
[58] Field of Search ............................. 359/70, 40, 41, 359/42, 631; 385/119, 901

[56] References Cited

U.S. PATENT DOCUMENTS

| | | | |
|---|---|---|---|
| 4,195,915 | 4/1980 | Lichty et al. | 359/70 |
| 4,787,711 | 11/1988 | Suzuki et al. | 359/631 |
| 4,799,765 | 1/1989 | Ferrer | 359/631 |
| 5,329,386 | 7/1994 | Birecki et al. | 359/42 |

*Primary Examiner*—William L. Sikes
*Assistant Examiner*—Ron Trice
*Attorney, Agent, or Firm*—Jeannette M. Walder; Wanda K. Denson-Low

[57] ABSTRACT

An optical arrangement that provides a telecentric helmet mounted display optical system. The optical arrangement comprises an image source including a faceplate wedge attached to a liquid crystal display, such as an active matrix liquid crystal display, for example, that is illuminated with collimated light. The output image is used as a light source for an off-axis or on-axis reflector used to produce an output image. The faceplate wedge corrects the anamorphic distortion exhibited in the off-axis reflector and directs the light energy into the off-axis entrance pupil of the reflector to maintain high uniformity over the exit pupil without sacrificing brightness. More particularly, the present invention comprises the input light source, and the liquid crystal display that is illuminated with collimated light from the light source. The faceplate wedge is optically coupled to the liquid crystal display, and the reflector is optically coupled to the faceplate wedge for producing an output image. The faceplate wedge corrects for anamorphic distortion exhibited in the reflector and directs light energy into an off-axis entrance pupil to maintain high uniformity over the exit pupil without sacrificing brightness. The reflector may comprise an off-axis or on-axis portion of a parabolic reflector. The optical arrangement may further comprise a collimating lens disposed between the liquid crystal display and the input light source. The collimating lens may comprise a Fresnel lens. In an off-axis version, the optical arrangement may further comprise first and second planar reflectors disposed between the input light source and the collimating lens, and a negative lens optically coupled to an output surface of the faceplate wedge. In an on-axis version, the optical arrangement may further comprise a beamsplitter optically coupled between the faceplate wedge and the reflector.

9 Claims, 3 Drawing Sheets

HELMET MOUNTED OFF AXIS LIQUID CRYSTAL DISPLAY WITH A FIBER OPTIC WEDGE AND A CURVED REFLECTOR

This invention was made with Government support under Contract No. DAAB07-93-C-C502 awarded by the Department of the Army. The Government has certain rights in this invention.

BACKGROUND

The present invention relates generally to liquid crystal display devices, and more particularly to a telecentric helmet mounted display for use in a liquid crystal display source.

In order to use rectilinear solid state image sources without distortion correction, an on-axis helmet mounted display optical system is commonly required. This may be accomplished using a number of conventional optical schemes. However, these conventional optical systems have a problem relating to significantly reduced see-through and brightness. For example, a beamsplitter may be added in the optical path between a wearer's eye and a visor/combiner of the helmet mounted display, to keep axial rays on-axis. However, this system is at least five times dimmer than an off-axis version of the same system. Furthermore, the amount of available eye relief is cut in half compared with the off-axis version. In addition, manufacturers of helmet mounted displays such as Kaiser, Honeywell, and GEC have demonstrated on-axis systems that use cathode ray tubes as image sources, but all of them suffer from the above-described on-axis problems.

It is conceivable that other optical measures may be employed to correct for distortion, such as employing a plurality of off-axis relays in the helmet mounted display. However, this approach would significantly increase the weight of the helmet mounted display.

In order to overcome the above-mentioned problems, the assignee of the present invention is developing "anamorphic" fiber optic devices that directly correct distortion in a helmet mounted display. However, helmet mounted displays using this device may have a cost and weight penalty that might limit their use in commercial products.

It is therefore an objective of the present invention to provide for a helmet mounted display having an improved display source that overcomes the limitations of conventional systems described above.

SUMMARY OF THE INVENTION

In order to meet the above and other objectives, the present invention is an optical arrangement that comprises a telecentric helmet mounted display optical system. The optical arrangement comprises an image source comprising a faceplate wedge attached to a liquid crystal display, such as an active matrix liquid crystal display, for example, that is illuminated with collimated light. The output image of the optical arrangement is used as a light source for an off-axis or on-axis reflector, which may be parabolic, for example, used to produce an output image from the helmet mounted display optical system. The faceplate wedge corrects the anamorphic distortion exhibited in the off-axis optics and directs the light energy into the off-axis entrance pupil of the optics of the helmet mounted display optical system to maintain high uniformity over the exit pupil without sacrificing brightness.

More particularly, the present invention is an optical arrangement that comprises an input light source, and an liquid crystal display that is illuminated with collimated light from the input light source. A faceplate wedge is optically coupled to the liquid crystal display, and the reflector is optically coupled to the faceplate wedge for producing an output image. The faceplate wedge corrects for anamorphic distortion exhibited in the reflector and directs light energy into an off-axis entrance pupil to maintain high uniformity over the exit pupil without sacrificing brightness.

The reflector may comprise an off-axis or on-axis portion of a parabolic reflector. The optical arrangement may further comprise a collimating lens disposed between the liquid crystal display and the input light source. The collimating lens may comprise a Fresnel lens.

In an off-axis version, the optical arrangement may further comprise first and second planar reflectors disposed between the input light source and the collimating lens, and a negative lens optically coupled to an output surface of the faceplate wedge. In an on-axis version, the optical arrangement may further comprise a beamsplitter optically coupled between the faceplate wedge and the reflector.

Helmet mounted displays designed and fabricated by the assignee of the present invention have taken advantage of off-axis optical designs to provide high see-through and high brightness by eliminating the need for an extra, lossy beamsplitter between the wearer's eye and the visor/combiner of the helmet mounted display. However, the one disadvantage of off-axis optical systems is the need to pre-distort the scene at the image source in order to view a rectilinear virtual image. Previously, a cathode ray tube has been used as the image source along with distortion circuitry that varies the sweep voltages of the tube. Future helmet mounted displays are expected to use solid state image sources, such as an active matrix liquid crystal display. Such devices are inherently rectilinear, thereby preventing the use of conventional distortion correction schemes used with cathode my tubes, and require the use of collimated illumination for high contrast.

By means of a novel application of fused fiber optic material, the improved helmet mounted display optical system is provided by the present invention. The optical system uses the active matrix liquid crystal display, maintains high brightness and throughput, significantly corrects distortion inherent in off-axis systems, allows for the use of full-color active matrix liquid crystal display sources, and provides a more pleasing virtual image of the liquid crystal display to a user. This is accomplished using only two imaging optical components for significantly reduced cost over conventional helmet mounted displays having similar performance and requirements.

With the advent of miniature solid state image sources, particularly active matrix liquid crystal displays, the cost and complexity of helmet mounted displays will be significantly lowered, thereby opening wide the commercial and military markets for such displays. For example, one use of the present invention is to provide a helmet mounted display that may be used by a surgeon to perform lapriscopic surgery, for example. The present optical system including its off-axis optics provides excellent performance in terms of weight, see-through, and brightness.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
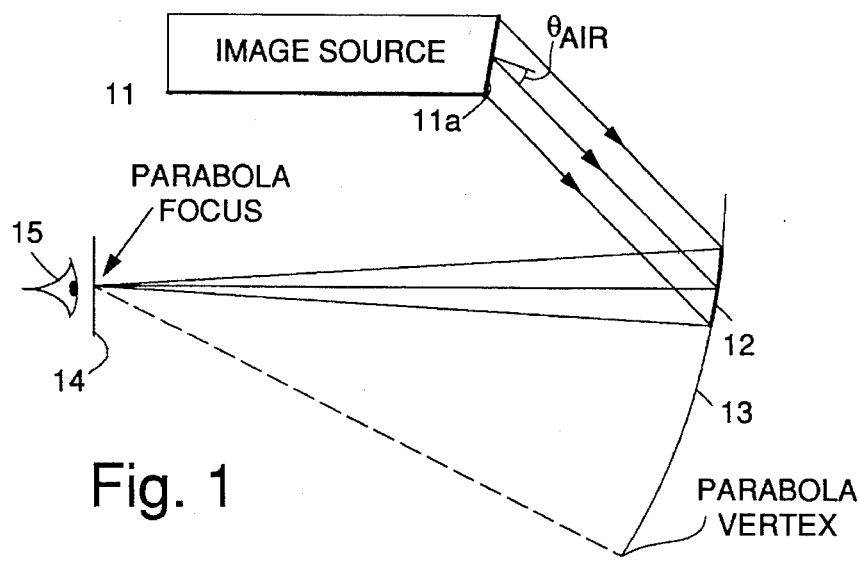
FIG. 1 illustrates an off-axis helmet mounted display optical system in accordance with the principles of the present invention.

Referring to the drawing figures, FIG. 1 is a representation of a helmet mounted display optical system 10 in accordance with the principles of the present invention. The helmet mounted display optical system 10 is comprised of a tilted image source 11 that provides a tilted image plane 11a, and a visor/combiner 12 or reflector 12 that is formed by using a curved mirror or reflector 13 (reflector with optical power) such as an off-axis portion of a parabolic reflector 13. It is to be understood that the curved mirror or reflector 13 may be spherical or parabolic, depending upon the requirements of the system in which it is employed. The tilted image source 11 provides for telecentric illumination of the visor/combiner 13. An image of the image source 11 is focused at an exit pupil 14 of the system 10 at the location of the eyes 15 of a wearer of the helmet mounted display optical system 10.

In order to achieve high brightness, the present off-axis helmet mounted display optical system eliminates the use of an extra beamsplitter required for conventional on-axis systems that is disposed between a wearer's eyes 15 and a visor/combiner. The image source 11 for the helmet mounted display optical system 10 comprises a liquid crystal display 23 (FIG. 3), such as an active matrix liquid crystal display 23, for example, that requires collimated illumination. Consequently, the off-axis helmet mounted display optical system 10 provides for telecentric illumination of the entrance pupil 14 from the image source 11. This is accomplished by using a reflector 12 comprising a section of an off-axis parabola 13, for example, and wherein the exit pupil 14 (eye location) is located at the focus of the parabola 13 and the image plane 11a of the image source 11 is placed along the path of a collimated beam incident on the parabola 13. For purposes of example, the parabola 13 has been chosen as the shape of the reflector 12, since it gives a perfect solution to the illumination problem. However, it is to be understood that a deviation from the parabolic reflector shape might be preferable in terms of other optical aberrations, and thus the specific design may deviate somewhat from the telecentric illumination criterion. A reflectors 12 having a spherical shape may also be employed, depending upon the requirements of the system 10.

As shown in FIG. 1, the off-axis helmet mounted display optical system 10 is workable as long as the size of the exit pupil 14 and field-of-view are not too large. In practice, for an exit pupil 14 having a size of about 15 mm in diameter (comparable to typical helmet mounted display systems currently in use), and a field of view of 30 diagonal degrees, and an eye relief of 3.5 inches, the blur size is on the order of 0.1 milliradian. Furthermore, the system 10 is completely color corrected since no refractive optical components are used between the image plane 11a of the image source 11 and the exit pupil 14 or wearer's eyes 15.

The off-axis system 10 requires that the image source 11 be tilted with respect to telecentric chief rays provided thereby in order to achieve a flat virtual image focus. However, by tilting the image plane 11a of the image source 11, anamorphic distortion is introduced, wherein the vertical dimension is magnified less than the horizontal dimension in the virtual image produced by the system 10.

Figure 2:
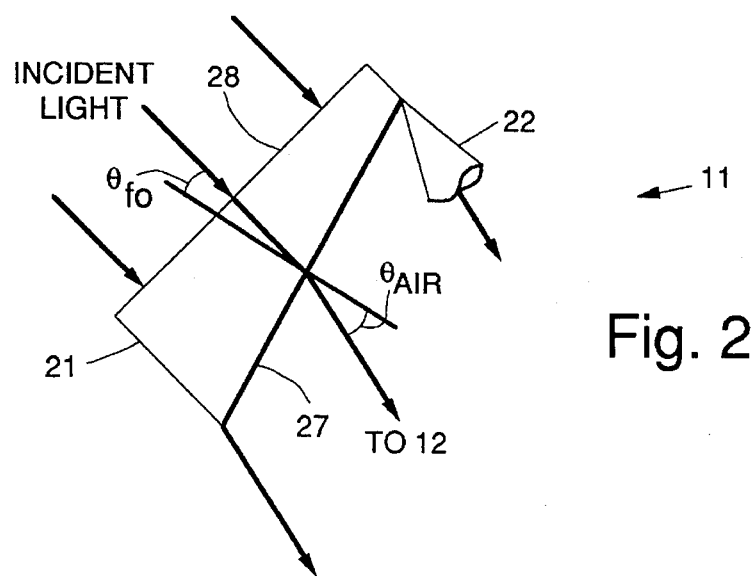
FIG. 2 illustrates an optical faceplate wedge that is employed with the image source of FIG. 1.

Referring to FIG. 2, it illustrates an fiber optic faceplate wedge 21 or faceplate wedge 21 that is employed with the image source 11 of FIG. 1. In order to compensate for both of the above-described problems, the faceplate wedge 21 is disposed at the image plane 11a of the image source 11. An output face 27 of the faceplate wedge 21 is placed parallel to the desired image plane 11a of the image source 11, and individual fibers of a fiber optic waveguide that form the faceplate wedge 21 are slanted to an angle such that Snell refraction of a beam of light passing straight down each fiber is deviated outside the wedge 21 to the correct angle in air required by the helmet mounted display optical system 10. At an input face 28 of the faceplate wedge 21, the plane is cut perpendicularly to the orientation of the optical fibers. Therefore, with collimated, perpendicularly-oriented illumination incident on the faceplate wedge 21, the output illumination tilts correctly into the off-axis entrance pupil 14 of the helmet mounted display optical system 10. Furthermore, by slightly grinding the surface of the output face 27 of the fiber optic faceplate wedge 21, the collimated illumination diffuses over a small cone 22, thereby, filling the entrance pupil 14 and providing uniform illumination over the exit pupil 14. Furthermore, and as may be seen in FIG. 2, the input face 28 of the fiber optic faceplate wedge 21 is shorter than the output face 27 (in an amount equal to the cosine of the slanted fiber angle). Therefore, the vertical dimension of the virtual image is increased, thereby reducing anamorphic distortion.

Figure 3:
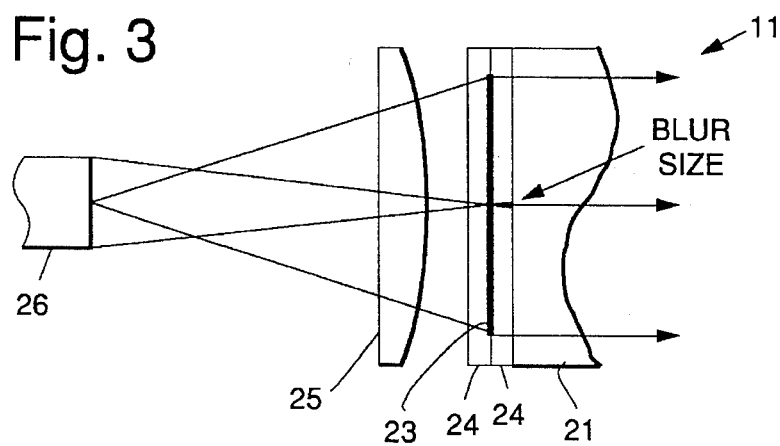
FIG. 3 illustrates reduction in blur size achieved by the optical system of FIG. 1.

FIG. 3 illustrates reduction in blur size achieved by the optical system 10 of FIG. 1. FIG. 3 illustrates the image source 11 of the present system 10 in more detail. The image source 11 includes the faceplate wedge 21 onto which is secured an active matrix liquid crystal display 23. The active matrix liquid crystal display 23 may be enclosed by cover glass 24, for example. A collimating lens 25 (Fresnel lens) is disposed between the active matrix liquid crystal display 23 and a fiber optic illuminator 26 comprising an input light source 26. Another benefit of using the fiber optic faceplate wedge 21 is to help blur out high resolution trace lines and transistor patterns found in the active matrix liquid crystal display 23. Such lines distract from the viewing quality of the image produced by the active matrix liquid crystal display 23. By using an active matrix liquid crystal display 23 that has cover glass 24 on the order of 3.71 mm thick (as is the case with an active matrix liquid crystal display 23 manufactured by Kopin, for example), the fiber optic faceplate wedge 21 is not in intimate contact with the image plane 11a of the active matrix liquid crystal display 23. By illuminating the active matrix liquid crystal display 23 with collimated light with a properly-chosen illumination cone angle, the blur size of the illumination is on the order of the size of the trace lines and is significantly smaller than the size of the individual pixels, as shown in FIG. 3. For example, for a pixel size of 0.055 mm, a glass gap of 0.71 mm (index of 1.5), and an image source 11 of 2 mm placed 50 mm behind the pixel, the cone angle in glass is 2/50/

1.5=0.027 radians. Through the gap created by the cover glass 24, the cone expand onto the fiber optic faceplate wedge 21 to a size of 0.027*0.71=0.019 mm. The blur size is much smaller than the pixel size of 0.055 mm and yet larger than the trace size of about 0.01 mm. The image provided by the fiber optic faceplate wedge 21 is therefore smoother and more pleasing to the eye. By using a collimating Fresnel lens 25 as a collimator located prior to the active matrix liquid crystal display 23, this technique also reduces moire patterns caused by interference between Fresnel rings and the matrix lines.

Figure 4:
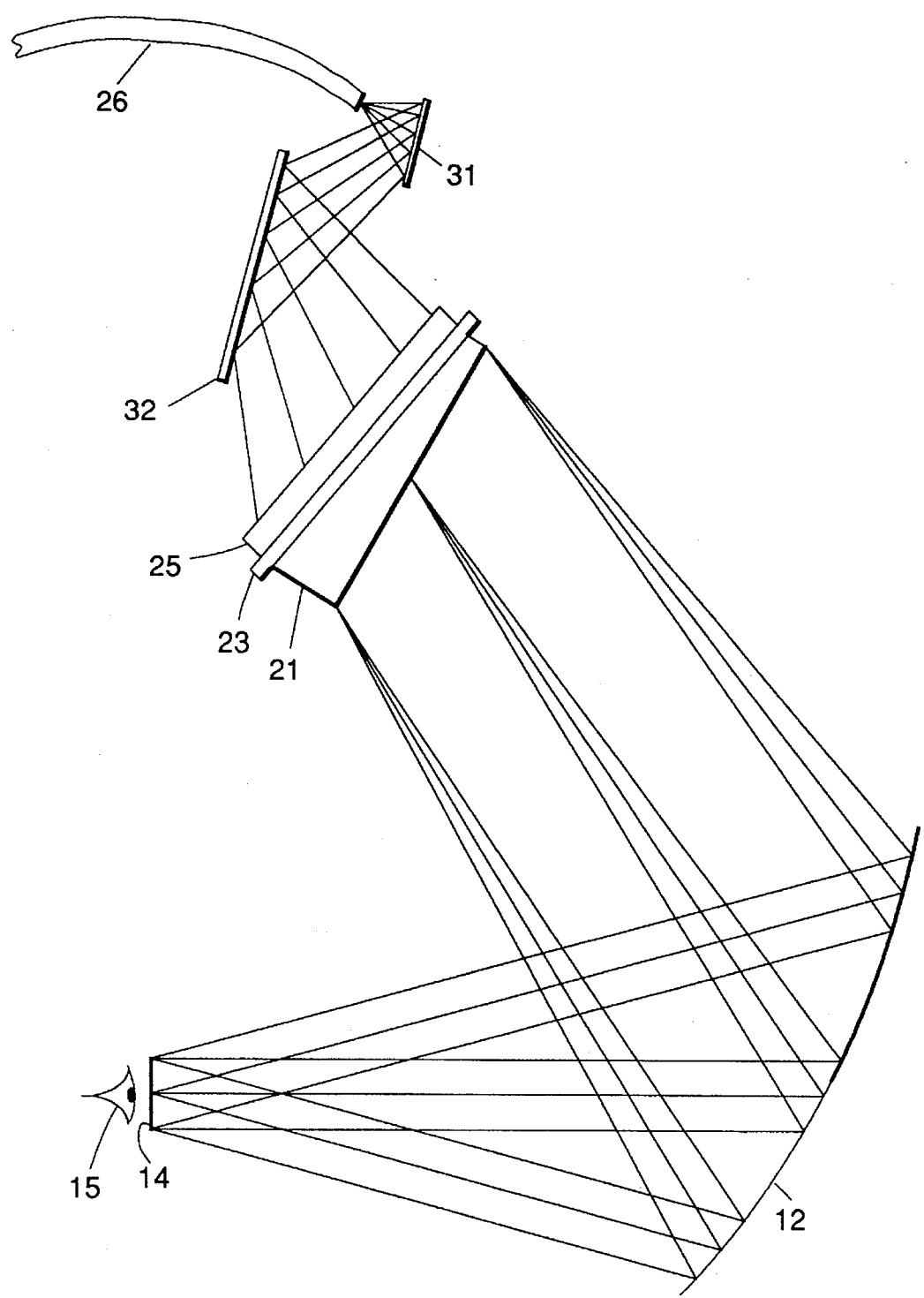
FIG. 4 illustrates an off-axis helmet mounted display optical system that has been reduced to practice.

As an example of an off-axis helmet mounted display optical system 10, FIG. 4 illustrates an off-axis helmet mounted display optical system 10 that has been reduced to practice. The off-axis helmet mounted display optical system 10 uses an active matrix liquid crystal display 23 having a format size 1.039 by 1.386, such as is provided by a 640 by 480 Kopin active matrix liquid crystal display 23. The input source 11 comprises the fiber optic illuminator 26 that provides light that is reflected from small and large reflectors 27, 28 onto an input surface of the collimating lens 25. The fiber optic faceplate wedge 21 has a wedge angle of 16.5 degrees. The parabolic visor/combiner 12 has a focal length 2.25 inches and is disposed off-axis by 2.8 inches (providing a bend angle of 54 degrees). An eye relief distance of 3.5 inches is provided between the parabolic visor/combiner 12 and the eye pupil 14. This off-axis system 10 provides a rectangular field of view of 18.4 inches by 24.5 inches, imaged at a distance of approximately 26 inches from the eye 15. Two such optical systems 10 are used, one for each eye 15, creating a fully binocular helmet mounted display optical system 10.

Figure 5:
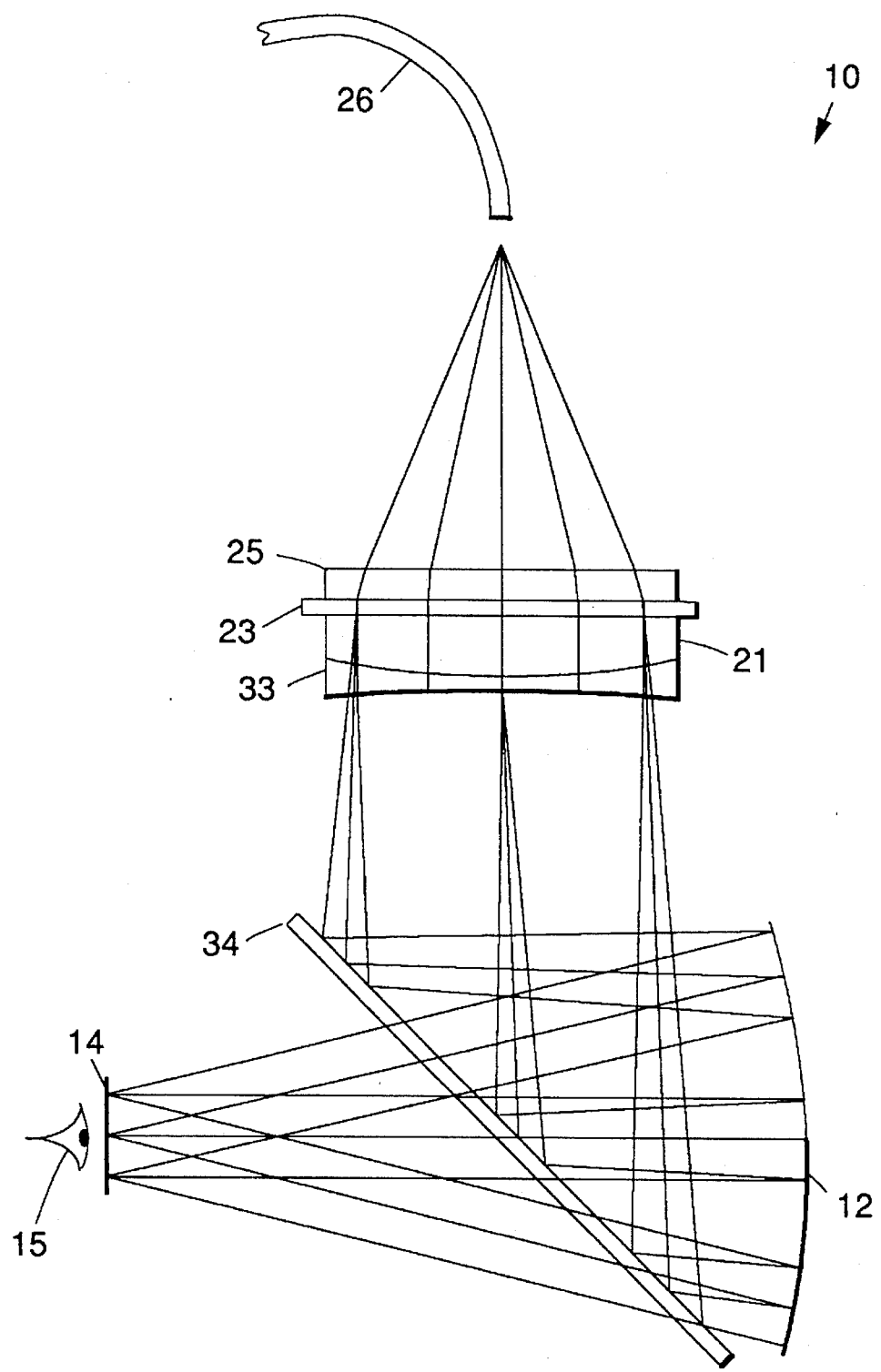
FIG. 5 illustrates an on-axis helmet mounted display optical system employing the principles of the present invention.

In addition to the above-described off-axis system 10, an on-axis helmet mounted display optical system 10 may also be designed to take advantage of the concepts of the present invention. FIG. 5 shows such an on-axis helmet mounted display optical system 10 that uses a negative lens 33 and curved fiber optic faceplate wedge 21 to produce both collimated chief rays and flatten out the field curvature. A beamsplitter 34 is used to make the system 10 more compact. The fiber optic faceplate wedge 21 is used to improve the optical design by producing appropriately directed light rays that are reflected from the beamsplitter 34 off of the visor/combiner 12, through the beamsplitter 34 and to the eye pupil 14 for viewing. The visor/combiner 12 shown in FIG. 5 has a spherical shaped, not a parabolic shape. Distortion correction is not required, but telecentric illumination of the active matrix liquid crystal display 23 is required. Although this particular on-axis system 10 has 3 to 5 times better optical performance than the off-axis version of the system 10, the visual performance does not appear to be significantly better.

The pixel size of the present on-axis and off-axis helmet mounted display optical systems 10 is larger than the optical spot size for both optical systems 10, making them display-limited with respect to visual resolution. The on-axis system 10 suffers in terms of brightness and see-through and weighs about 25% more than the off-axis system 10.

Other image sources 11 other than the active matrix liquid crystal display 23 may be used in the present helmet mounted display optical systems 10. Self-emissive displays, such as cathode ray tubes and electroluminescent displays may be used in place of the active matrix liquid crystal display 23. Though the telecentric illumination is now not required, distortion correction for the off-axis version would be helpful.

The following optical prescription represents a completed computer-optimized optical design of the present helmet mounted display system 10. From this data, a person skilled in the an of optical design may reconstruct, test, and verify all aspects of the present invention.

The listings below are the output of an optical design program used by the assignee of the present invention. However, any currently available commercial optical design program may also be used to reproduce the design presented herein. The optical design is based on sequential surfaces beginning backwards (as the light travels) with the virtual image plane (surface 0) to the output of the fiber optic illumination bundle (surface 19). The following is a list of the important surfaces and their corresponding numbers in the lists:

| | |
|---|---|
| Virtual image plane | 0 |
| Exit pupil (eye) | 2 |
| Parabolic visor/combiner | 4 |
| Fold mirror | 6 |
| Fiber optic wedge | 8–11 |
| Image source plane | 11 |
| Aspheric Fresnel lens | 13–14 |
| Small folding mirror | 15 |
| Fiber optic bundle output | 19 |

The following dam (in order) are included: the basic lens data is radius (RD), thickness CTH), and transmission medium (Medium); nominal index (RN); the aspheric data for the parabola and Fresnel lens is Type (positive—TILT, or negative—RTILT), tilt (Alpha) about the X axis, and X and Y decenters (XD, YD); and clear aperture data—Type, dimensions (CAY, CAX) and decentration (YDEC, XDEC).

BASIC LENS DATA

| SURF | RD | TH | MEDIUM | RN |
|---|---|---|---|---|
| 0 | 0.000000E+00 | −24.0000 | Air | |
| 1 | 0.000000E+00 | 0.000000E+00 | Air | |
| 2 | 0.000000E+00 | 3.50000 | Air | |
| 3 | 0.000000E+00 | 0.409422 | Air | |
| 4 | −6.18116 | −0.409422 | Mirror | |
| 5 | 0.000000E+00 | −2.10000 | Air | |
| 6 | 0.000000E+00 | 0.000000E+00 | Mirror | |
| 7 | 0.000000E+00 | 0.914850 | Air | |
| 8 | 0.000000E+00 | 0.000000E+00 | Glass FO | 1.620000 |
| 9 | 0.000000E+00 | 0.253474 | Glass FO | 1.620000 |
| 10 | 0.000000E+00 | 0.000000E+00 | Glass FO | 1.620000 |
| 11 | 0.000000E+00 | 0.560000E−01 | Schott BK7 | 1.516800 |
| 12 | 0.000000E+00 | 0.500000E−02 | Air | |
| 13 | 0.778554 | 0.125000 | Plastic Acrylic | 1.491763 |
| 14 | 0.000000E+00 | 0.450000 | Air | |
| 15 | 0.000000E+00 | 0.000000E+00 | Mirror | |
| 16 | 0.000000E+00 | −1.05000 | Air | |
| 17 | 0.000000E+00 | 0.000000E+00 | Air | |
| 18 | 0.000000E+00 | 0.000000E+00 | Air | |
| 19 | 0.000000E+00 | | | |

ASPHERIC DATA

| SURF | CC |
|---|---|
| 4 | −1.0000 |
| 13 | −0.91453 |

TILT AND DEC DATA

| SURF | TYPE | YD | XD | Alpha |
|---|---|---|---|---|
| 1 | TILT | −8.500000 | 0.000000 | 0.000000 |
| 2 | TILT A | 0.000000 | 0.000000 | 19.502449 |
| 3 | TILT | 0.000000 | 0.000000 | −40.000000 |
| 4 | DEC | −2.249757 | 0.000000 | |
| 5 | RTILT | −2.249757 | 0.000000 | 0.000000 |

-continued

|  SURF | TYPE |  |  |  |  |
|---|---|---|---|---|---|
| 6 | TILT | 0.000000 | 0.000000 | 45.000000 | |
| 7 | MT | 0.000000 | 0.000000 | 45.000000 | |
| 8 | TILT | 0.000000 | 0.000000 | −31.000000 | |
| 9 | TILT A | 0.000000 | 0.000000 | 18.537468 | |
| 10 | RTILT | 0.000000 | 0.000000 | 0.000000 | |
| 15 | TILT | 0.000000 | 0.000000 | −35.000000 | |
| 16 | TILT | 0.000000 | 0.000000 | −35.000000 | |

| CLEAR APERTURES | | | | | |
|---|---|---|---|---|---|
| SURF | TYPE | CAY | CAX | YDEC | XDEC |
| 2 | CIRC | 0.29528 | | | |
| 4 | RECT | 2.5000 | 1.0000 | 2.50 | 0.000E+00 |
| 8 | RECT | 0.54790 | 0.69300 | | |
| 10 | RECT | 0.51950 | 0.69300 | | |
| 11 | RECT | 0.69000 | 0.81250 | | |
| 12 | RECT | 0.69000 | 0.81250 | | |
| 13 | RECT | 0.51950 | 0.69300 | | |
| 14 | RECT | 0.51950 | 0.69300 | | |
| 15 | RECT | 0.50000 | 0.65000 | −.150 | 0.000E+00 |
| 19 | CIRC | 0.40000E−01 | | | |

Thus there has been described new and improved optical arrangements comprising helmet mounted displays having improved display sources. It is to be understood that the above-described embodiments are merely illustrative of some of the many specific embodiments that represent applications of the principles of the present invention. Clearly, numerous and other arrangements can be readily devised by those skilled in the art without departing from the scope of the invention.

What is claimed is:

1. An optical arrangement comprising:
    an input light source;
    a liquid crystal display that is illuminated with collimated light from the input light source;
    a fiber optic faceplate wedge optically coupled to the matrix liquid crystal display;
    a curved reflector optically coupled to the faceplate wedge for producing an output image;
    and wherein the fiber optic wedge corrects for anamorphic distortion exhibited in the reflector and directs light energy into an off-axis entrance pupil to maintain high uniformity over the exit pupil without sacrificing brightness.

2. The optical arrangement of claim 1 wherein the liquid crystal display comprises an active matrix liquid crystal display.

3. The optical arrangement of claim 1 wherein the curved reflector comprises an off-axis portion of a parabolic reflector.

4. The optical arrangement of claim 1 wherein the parabolic reflector comprises an on-axis portion of a parabolic reflector 5. The optical arrangement of claim 1 which further comprises:
    a collimating lens disposed between the liquid crystal display and the input light source.

6. The optical arrangement of claim 5 wherein the collimating lens comprises a Fresnel lens.

7. The optical arrangement of claim 5 which further comprises:
    first and second planar reflectors disposed between the input light source and the collimating lens; and
    a negative lens optically coupled to an output surface of the faceplate wedge.

8. The optical arrangement of claim 1 wherein the curved reflector comprises a parabolic reflector.

9. The optical arrangement of claim 1 wherein the curved reflector comprises a spherical reflector.

* * * * *